United States Patent
Nemitz et al.

(10) Patent No.: US 9,240,015 B2
(45) Date of Patent: Jan. 19, 2016

(54) METHOD AND SYSTEM FOR SYNCHRONIZING DELIVERY OF PROMOTIONAL MATERIAL TO COMPUTING DEVICES

(75) Inventors: George M. Nemitz, Pennington, NJ (US); Vincent James Spinella, Colts Neck, NJ (US); Rajiv Konkimalla, Edison, NJ (US); Stephen Andrew Nowalk, Edison, NJ (US)

(73) Assignee: A2ZLOGIX, INC., Edison, NJ (US)

( * ) Notice: Subject to any disclaimer, the term of this patent is extended or adjusted under 35 U.S.C. 154(b) by 1380 days.

(21) Appl. No.: 12/463,131

(22) Filed: May 8, 2009

(65) Prior Publication Data

US 2010/0287035 A1   Nov. 11, 2010

(51) Int. Cl.
*G06Q 30/00* (2012.01)
*G06Q 30/02* (2012.01)
*G06Q 10/06* (2012.01)

(52) U.S. Cl.
CPC ............. *G06Q 30/02* (2013.01); *G06Q 10/06* (2013.01); *G06Q 30/0241* (2013.01); *G06Q 30/0264* (2013.01); *G06Q 30/0269* (2013.01)

(58) Field of Classification Search
USPC ............ 705/14.67, 14.49, 14.66, 14.64, 14.4; 710/100, 200, 220; 707/610; 713/375, 713/400
See application file for complete search history.

(56) References Cited

U.S. PATENT DOCUMENTS

| | | | |
|---|---|---|---|
| 5,809,497 A * | 9/1998 | Freund et al. | 1/1 |
| 5,812,793 A * | 9/1998 | Shakib et al. | 709/201 |
| 5,835,087 A | 11/1998 | Herz et al. | |
| 6,216,129 B1 | 4/2001 | Eldering | |
| 6,259,405 B1 | 7/2001 | Stewart et al. | |
| 6,421,717 B1 * | 7/2002 | Kloba et al. | 709/219 |
| 6,647,257 B2 | 11/2003 | Owensby | |
| 6,647,269 B2 | 11/2003 | Hendrey et al. | |
| 6,671,757 B1 * | 12/2003 | Multer | H04L 67/1095 707/999.201 |
| 6,826,614 B1 | 11/2004 | Hanmann et al. | |
| 7,263,551 B2 * | 8/2007 | Belfiore et al. | 709/219 |
| 7,401,104 B2 * | 7/2008 | Shah et al. | 707/620 |
| 7,454,462 B2 * | 11/2008 | Belfiore et al. | 709/203 |
| 7,761,414 B2 * | 7/2010 | Freedman | G06F 17/30578 707/610 |
| 8,321,534 B1 * | 11/2012 | Roskind et al. | 709/220 |
| 2002/0116271 A1 * | 8/2002 | Mankoff | 705/14 |
| 2003/0018521 A1 | 1/2003 | Kraft et al. | |
| 2003/0045301 A1 | 3/2003 | Wollrab | |

(Continued)

FOREIGN PATENT DOCUMENTS

WO   WO 03 073292   *   9/2003   ............. G06F 12/00

OTHER PUBLICATIONS

Shane McGlaun, Location Aware Applications to Surge in 2009, DailyTech, Jan. 19, 2009.

(Continued)

*Primary Examiner* — Luis A Brown
(74) *Attorney, Agent, or Firm* — Lowenstein Sandler LLP

(57) ABSTRACT

A system and method for identifying, managing, and synchronizing delivery and storage of promotional material to computing devices associated with a user. The system and method are configured to receive a request from one or more of the user's computing devices to synchronize the delivery of the promotional material to at least a portion of the user's device portfolio. Advantageously, tile action triggering the sending of the synchronization request may include an interaction with the promotional material or an interaction with a web service application.

15 Claims, 3 Drawing Sheets

(56) References Cited

U.S. PATENT DOCUMENTS

| | | | |
|---|---|---|---|
| 2003/0045311 A1* | 3/2003 | Larikka et al. | 455/466 |
| 2003/0104833 A1* | 6/2003 | Chiu | 455/556 |
| 2004/0054800 A1* | 3/2004 | Shah et al. | 709/231 |
| 2004/0210477 A1 | 10/2004 | McIntyre | |
| 2005/0216336 A1 | 9/2005 | Roberts et al. | |
| 2006/0036495 A1* | 2/2006 | Aufricht et al. | 705/14 |
| 2006/0190330 A1 | 8/2006 | Tollinger et al. | |
| 2006/0190331 A1 | 8/2006 | Tollinger et al. | |
| 2006/0215569 A1* | 9/2006 | Khosravy et al. | 370/241 |
| 2007/0016362 A1* | 1/2007 | Nelson | 701/200 |
| 2007/0038516 A1* | 2/2007 | Apple et al. | 705/14 |
| 2007/0198339 A1 | 8/2007 | Shen et al. | |
| 2007/0244750 A1* | 10/2007 | Grannan et al. | 705/14 |
| 2007/0294292 A1* | 12/2007 | Hydrie et al. | 707/104.1 |
| 2008/0004957 A1 | 1/2008 | Hildreth et al. | |
| 2008/0005168 A1* | 1/2008 | Huff et al. | 707/104.1 |
| 2008/0046944 A1 | 2/2008 | Lee | |
| 2008/0083003 A1 | 4/2008 | Biniak et al. | |
| 2008/0140529 A1 | 6/2008 | Agarwal et al. | |
| 2008/0176536 A1* | 7/2008 | Galluzzo et al. | 455/414.1 |
| 2008/0201731 A1* | 8/2008 | Howcroft | 725/13 |
| 2008/0242277 A1 | 10/2008 | Chen | |
| 2009/0030787 A1 | 1/2009 | Pon et al. | |
| 2009/0265236 A1* | 10/2009 | Schultz et al. | 705/14 |
| 2009/0282458 A1* | 11/2009 | Hjelm | 726/1 |
| 2009/0318168 A1* | 12/2009 | Khosravy et al. | 455/456.3 |
| 2010/0262500 A1* | 10/2010 | Yu | 705/14.73 |

OTHER PUBLICATIONS

International Search Report for International Patent Application No. PCT/US2010/033874 issued Jun. 29, 2010.

European Search Report for EPC Patent Application No. 10772829 dated Mar. 26, 2013.

* cited by examiner

METHOD AND SYSTEM FOR SYNCHRONIZING DELIVERY OF PROMOTIONAL MATERIAL TO COMPUTING DEVICES

FIELD OF THE INVENTION

The present invention relates generally to the distribution of promotional material, and, more particularly, to a system and method for identifying, managing, and synchronizing delivery of promotional material to computing devices.

BACKGROUND OF THE INVENTION

Cloud computing is well known as an Internet based computer technology, whereby dynamically scalable and often virtualized resources are provided as a service over the Internet. Advantageously, users need not have knowledge of, expertise in, or control over the technology infrastructure "in the cloud" that supports them.

Cloud computing is based upon web-based Application Programming Interfaces (APIs) known as web services. Without web services, cloud computing would not exist. Web services are an embedded part of consumer applications such as Facebook, Twitter, eBay®, and Amazon.com.

One drawback to conventional cloud computing is that not all activity can be performed "in the cloud." A large percentage of web services require local computation and offline persistence (storage or caching of data) on computing devices (e.g., desktop computer, mobile smartphone, video game consoles). The requirement of offline persistence can create problems for web services as the number of people utilizing multiple computing devices increases. Problems can occur when an individual uses more than one computing device to access web services that require data to be stored or cached on the computing device. Often, the data required by the web service will become out of sync as the individual user switches back and forth between his or her different computing devices.

Synchronization is commonly thought of as a means to keep contact and calendar information consistent between a mobile device (e.g., mobile phones, personal digital assistants) and a computer. Synchronization is now being used to support other types of applications such as social networking, online shopping and online auctions. Synchronization manages the interactions between the plurality of mobile devices and at least one personalized application that have enabled access via web services (e.g., Facebook, Twitter, E-Bay, Amazon.com).

Providing promotional material (e.g., advertisements, loyalty card programs, coupons, rebates) "in the clouds" has been problematic as well. Google's Internet search-based advertisements model is viewed as a value to users when searching the Internet and it has proved to be a successful and profitable advertisement mechanism. However, users have not shown the same positive reaction to advertisements when displayed in web services (e.g., social networking websites). As a result, many cloud web services relying on revenue from promotional material still struggle to yield a profit.

One advertising challenge faced by certain web services is that it is not only necessary to target the user, but it is also necessary to target the computing device or devices utilized by the user. As an example, promotional material for a new downloadable video game may be received by a user on his or her smartphone, but not received by the user's video game console, where it is appropriate and desirable. A user interested in the video game advertised in the promotion at the time he or she views the promotional material on his or her smartphone may later forget about the advertisement or lose interest in the game if the promotional material is not also received on the user's video game console. However, the same user is more likely to consider and act on the same promotional material if it were available at the video game console, thereby increasing the likelihood that the promotion will be effective.

Therefore, there is a need for a method and system for efficiently and effectively identifying, managing and delivering promotional material to computing devices.

SUMMARY OF THE INVENTION

The above-described problems are addressed and a technical solution is achieved in the art by a system and a method for identifying, transporting, managing and caching promotional material to multiple computing devices. According to an embodiment of the invention, promotional material may include, but are not limited to, advertisements, loyalty programs, coupons and rebates.

According to an embodiment of the present, the system and method comprises a "Synchronization Gateway Computer Module" and a "Promotion Indexing Service Computer Module," as described in detail below. According to an embodiment of the invention, the Synchronization Gateway Computer Module provides for efficient transport and management of synchronization requests and promotional material between a one or more of a plurality of computing devices and one or more Promotion Indexing Services Computer Module. According to an embodiment of the invention, the Promotion Indexing Service Computer Module provides for the efficient identification of promotional material based on profile information received from the Synchronization Gateway Computer Module.

According to an embodiment of the invention, the Synchronization Gateway Computer Module receives synchronization requests from one or more of the computing devices maintained by a user in his or her 'user device portfolio'. The Synchronization Gateway Computer Module is configured to extract 'profile information' from the synchronization request, wherein the 'profile information' may include, but is not limited to, a user's age, gender, likes, dislikes, interests, hobbies, Global Positioning System (GPS) location, Mobile Dialing Number (MDN), and the types of computing devices in the user device portfolio.

According to an embodiment of the invention, the Synchronization Gateway Computer Module is configured to send the profile information to one or more Promotion Indexing Service Computer Modules wherein the profile information is processed according to a promotion selection algorithm to identify promotional material suitable for the user and the user's computing devices.

According to an embodiment of the invention, the Promotion Indexing Service Computer Module receives the promotional material selected in accordance with the promotion selection algorithm and provides the promotional material to the Synchronization Gateway Computer Module. According to an embodiment of the invention, the promotional material provided by the Promotion Indexing Service Computer Modules to the Synchronization Gateway Computer Module may contain delivery information identifying which one or more computing devices is to receive the promotional material.

According to an embodiment of the invention, the Synchronization Gateway Computer Module receives promotional material from the Promotion Indexing Service Computer and delivers the selected promotional material to the computing devices identified in the profile information.

BRIEF DESCRIPTION OF THE DRAWINGS

The present invention will be more readily understood from the detailed description of exemplary embodiments presented below considered in conjunction with the attached drawings, of which.

Figure 1:
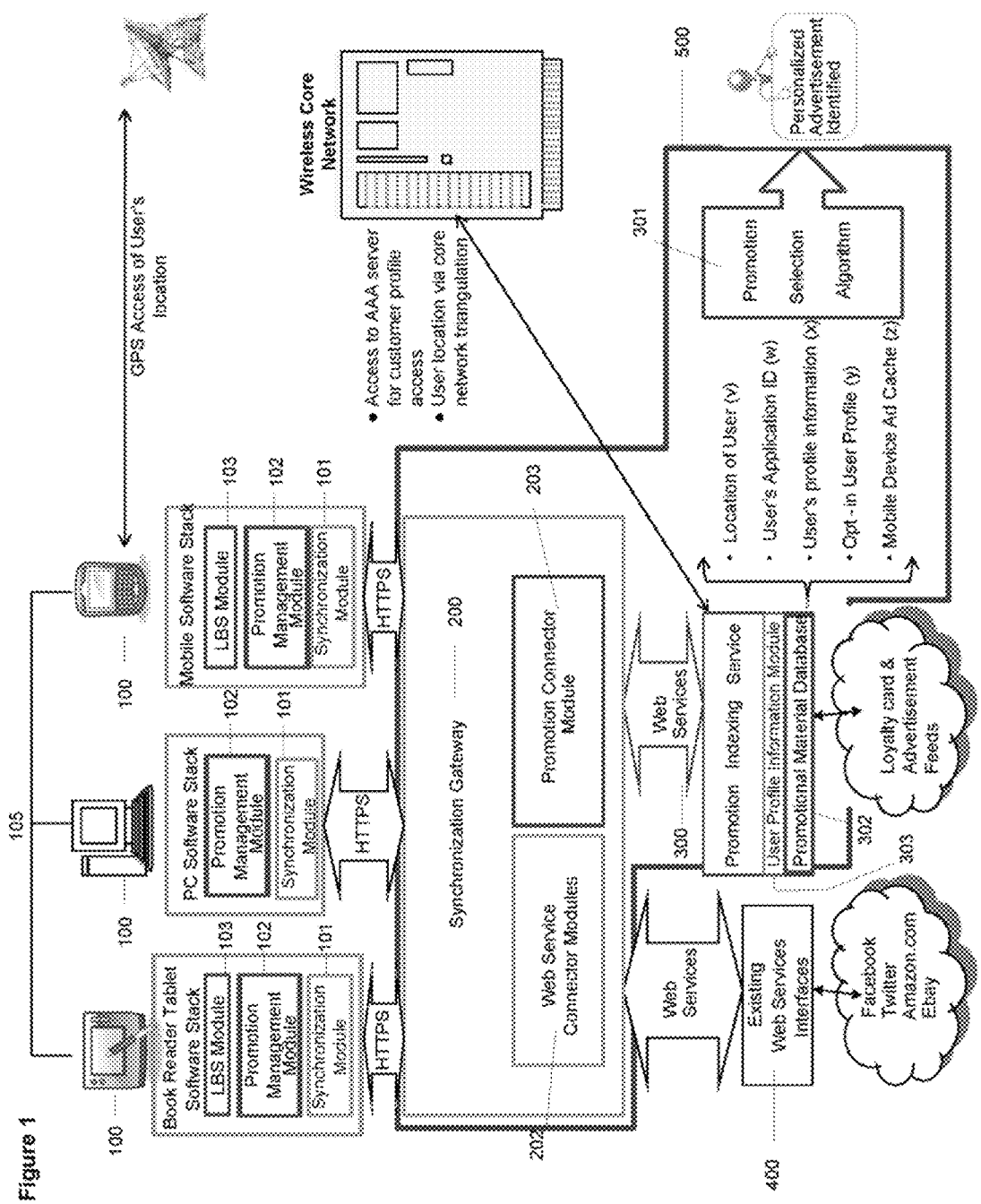
FIG. 1 illustrates an exemplary promotional material synchronization system configured to identify, manage and synchronize delivery of promotional material provided by a web service to a plurality of computing devices associated with a user, according to an embodiment of the present invention.

It is to be understood that the attached drawings are for purposes of illustrating the concepts of the invention and may not be to scale.

DETAILED DESCRIPTION OF THE INVENTION

The present invention relates to a method and a system for identifying, managing and synchronizing delivery of promotional material provided by web services to a plurality of computing devices associated with a "user device portfolio."

The term "user device portfolio" refers to a plurality of computing devices associated with, managed by, or accessed by the user among which the user wishes to have certain data synchronized. The user is able to add and remove devices from his or her device portfolio as necessary. Furthermore, the user device portfolio may consist of all of the user's computing devices, any designated subset of the computing devices the user has access to, and/or a third party's device(s) (e.g., devices associated with a "friend").

As used herein, the term "promotional material" or "promotional materials" may include, but are not limited to, any advertisement, brochure, coupon, loyalty card programs, and rebate offering. Furthermore, promotional material can exist in multiple formats, which can include, but are not limited to, photos, text, SMS, audio, video, or any combination thereof.

The methods and systems according to embodiments of the present invention allow a user to 1) synchronize the delivery of desirable promotional material across the user device portfolio when accessing a web service from a computing device, 2) synchronize the delivery of desirable promotional material across the user device portfolio in response to a synchronization request initiated by one or more of the user's computing devices, and 3) synchronize the delivery of stored or cached desirable promotional material from a first computing device to one or more other computing devices in the user device portfolio.

One having ordinary skill in the art will appreciate that a "web service" includes any software system designed to support interoperable machine-to-machine interaction over a network. A web service may comprise a web application programming interfaces (API) that is accessed over a network and executed on a remote system hosting the requested service. One having ordinary skill in the art will appreciate that a network suitable for use in accordance with embodiments of the present invention includes any medium on which electronic data can be transported. Examples of such networks includes, but is not limited to, the Internet, a cellular network, a wired network, a wireless network, a local area network, a 4G network, a 3G network, a 2G network, a satellite network, a DSL network, a cable network, a FIOS network, and a combination thereof. In addition, one having ordinary skill in the art will appreciate that any protocol may be used to transport the electronic data across the network. Examples of such protocols include, but are not limited to, HTTP, HTTPS, Bluetooth, SNMP, SOAP, and TCP/IP.

According to an embodiment of the present invention, a computing device is comprised of one or more of a central-processing unit, computer-readable memory, and persistent computer-readable storage. Exemplary computing devices suitable for use in concordance with the present invention include, but are not limited to, a cellular device, a mobile smartphone (e.g., Blackberries, Apple iPhones), a personal computer, a laptop computer, a cable set-top box, a wireless book reader, a home theater computer, a video game consoles (e.g., Playstation 3, Playstation Portable, Nintendo Wii, Microsoft Xbox 360) and any computing device with network connectivity (e.g., refrigerators connectable to a network, household appliances connectable to a network, televisions connectable to a network).

FIG. 1 depicts an exemplary embodiment of the methods and systems according to the present invention. As shown in FIG. 1, according to an embodiment, a system herein referred to as a "Promotional Material Synchronization System" 500 comprises a Synchronization Gateway Computer Module 200 (also referred to as the Synchronization Gateway 200) and a communicatively connected Promotion Indexing Service Computer Module 300 (also referred to as the Promotion Indexing Service 300). The term "communicatively connected" is intended to include any type of connection, whether wired or wireless, in which data may be communicated, and may include a connection between devices, modules and/or programs within a single computer or between devices, modules and/or programs on separate computers.

The Promotional Material Synchronization System 500 is configured to process various types of "synchronization request(s)." "Synchronization request(s)" are request(s) made by a computing device 100 in order to establish consistency among data on remote sources. According to an embodiment of the present invention, the data to be synchronized among the computing devices 100 of the user device portfolio 105 is data related to or consisting of, but not limited to, promotional materials and "profile information."

The term "Profile information" refers to information that identifies a user and a user device portfolio and consists of any information related to a user, including, but not limited to, one or more of the following: a user's age, address, gender, contact information, e-mail address(es), associated computing devices 100, user device portfolio 105, computing devices 100 selected for inclusion in the user device portfolio 105; interests (e.g., shopping, sports, hobbies, health, medicine, entertainment, home and gardening); and types of communications means for transmission and types of promotional material (e.g., text, sms, image, audio, video, advertisement, coupon, loyalty card program, etc.).

According to an embodiment of the present invention, a synchronization request is initiated on a first computing device 100 and received by the Synchronization Gateway 200 with the purpose of establishing consistency among data (e.g., promotional material) across a portion or the whole of the user device portfolio 105. A synchronization request may be initiated by: 1) launching a web service application located on one of the user computing devices 100 (e.g., the smartphone Facebook application); 2) a user specifically requesting new promotional material to be synchronized to the computing devices 100 of the user device portfolio 105; 3) a user requesting that promotional material previously stored or cached on a first computing device 100 be synchronized to one or more additional computing devices 100 in the user device portfolio 105; and 4) a user requesting an update to his or her profile information.

According to an embodiment of the present invention, the computing devices 100 comprise a Synchronization Module 101 and a Promotion Management Module 102. The Synchronization Module 101 is configured to communicate with the Synchronization Gateway 200 over any suitable network using any suitable protocol, receive promotional material from the Synchronization Gateway 200, and store or cache the promotional material on the persistent storage of the computing device 100. Furthermore, the Synchronization Module 101 is configured to communicate profile information to the Synchronization Gateway 200 from the Promotion Management Module 102.

According to an embodiment of the present invention, the Synchronization Module 101 is integrated into applications that are located on the computing device 100 and that are configured to access a web service 400. The integration with these applications allows a user to synchronize his or her web service data with the web service 400 at the same time as the synchronization of promotional material.

According to an embodiment of the present invention, the Synchronization Module 101 is configured to access a Location Based Service (LBS) Module 103 of a computing device 100. The LBS Module 103 is configured to determine the user's location information. The Synchronization Module 101 receives location information from the LBS Module 103 and transmits the location information to the Synchronization Gateway 200 during a synchronization request. One having ordinary skill in the art will appreciate that location information may be derived in various ways. Exemplary methods for obtaining location information include global position system (GPS) data and triangulation of cellular signals based on the radio signal delay of the closest cell-phone towers.

According to an embodiment of the present invention, the computing devices 100 contain a Promotion Management Module 102. The Promotion Management Module 102 is configured to perform one or more of the following functions: 1) make any necessary changes to the user's profile information; 2) interact with promotional material stored or cached on the computing device 100 (e.g., view advertisements, redeem coupons, join loyalty card programs); 3) store information related to the user's consumption of promotional material stored or cached on one or more of the user's computing devices 100; 4) initiate a synchronization request in conjunction with a Synchronization Module 101; and 5) notify a user that new promotional material has been received.

According to an embodiment of the present invention, the Promotion Management Module 102 is configured to utilize a Synchronization Module 101 that is independent from Synchronization Modules 101 associated with other web service applications. This configuration allows a Promotion Management Module 102 to generate synchronization requests without access or use of another web service application.

According to an embodiment of the present invention, the synchronization request initiated by a Promotion Management Module 102 is configured to perform one or more of the following functions: 1) request an update to profile information stored in the User Profile Information Module 303; 2) request additional promotional material; and 3) request that promotional material, currently stored on the computing device 100 that the Promotion Management Module 102 is located on, be synchronized to one or more additional computing devices 100 in the user device portfolio 105. The synchronization request is sent from the Promotion Management Module 102 to the Synchronization Module 101 located on the computing device 100 for processing by the Synchronization Module 101.

According to an embodiment of the present invention, the Promotion Management Module 102 is configured to determine the ability of a computing device 100 to present various types and/or formats of promotional material mediums (e.g., text, video, audio) and use the Synchronization Module 101 to communicate the determination to the User Profile Information Module 303 on the Promotional Indexing Service via the Synchronization Gateway 200.

According to an embodiment of the present invention, the Synchronization Gateway 200 is configured to receive synchronization requests from the Synchronization Module 101 of the user's computing device 100. Once a synchronization request has been received from a computing device 100, the Synchronization Gateway 200 uses the profile information associated with the synchronization request to determine what action should be taken. The Synchronization Gateway 200 may determine that a synchronization request consists of a request to synchronize web service data from a web service 400 to the user device portfolio 105 or the user's computing device 100. Additionally, a synchronization request may comprise a request to synchronize promotional material located on one of the computing devices 100 associated with a user device portfolio 105 to one or more additional computing devices 100 associated with the user device portfolio 105. Furthermore, the synchronization requests received from the Synchronization Module 101 may comprise a request to update "user profile information" stored in a User Profile Information Module 303.

The Synchronization Gateway 200 is configured to communicate with web services 400 through Web Service Connector Modules 202. One with ordinary skill in the art will appreciate that web services 400 contain Application Programming Interfaces (APIs) which allow third-party applications to access and utilize the web services 400 in pre-determined ways. The Web Service Connector Modules 202 are configured to utilize the APIs provided by the web services 400 to retrieve and synchronize personal information as requested by the computing device 100.

According to an embodiment of the present invention, there is a one-to-one correspondence between an application that constitutes a Synchronization Module 101, a Web Service Connector Module 202 and a web service 400. A Web Service Connector Module 202 is registered in the Synchronization Gateway 200 with credential information associated with an application. An application's Synchronization Module 101 is configured to use credential information to seamlessly contact the appropriate Web Service Connector Module 202 via the Synchronization Gateway 200. Every application has its own Synchronization Module 101 with credential information specific to the application. This configuration provides the Synchronization Module 101 associated with the application the ability to interact with the corresponding Web Service Connector Module 202 located at the Synchronization Gateway 200.

One of ordinary skill in the art will appreciate that credential information may be comprised of any information that identifies or distinguishes a particular user. Examples of credential information include, but are not limited to, user names, passwords, IP addresses, digital signatures, telephone numbers, and pin numbers.

According to an embodiment of the present invention, the Synchronization Gateway 200 is communicatively connected to the Promotion Indexing Service 300 via a Promotion Connector Module 203. The Promotion Connector Module 203 is configured to send profile information received from a computing device 100 to the Promotion Indexing Service 300 and receive promotional material from the Promotion Indexing Service 300 over any suitable network using any suitable protocol.

According to an embodiment of the present invention, in order to communicate with the Synchronization Gateway 200, a computing device 100 comprises the Synchronization Module 101 and the Promotion Management Module 102. When any of the computing devices 100 of the user device portfolio 105 initiates the Promotion Management Module 102 or starts any other programs that are associated with a Synchronization Module 101, the Synchronization Module 101 is configured to initiate a synchronization request to the Synchronization Gateway 200. The Synchronization Gateway 200 will then deliver to the Synchronization Module 101 all new promotional material waiting to be delivered to the computing device 100. This method of synchronization is referred to as data "pull" synchronization.

According to an embodiment of the present invention, in a "pull" synchronization, one of the computing devices 100 of the user device portfolio 105 sends a synchronization request to synchronize promotional material across the entire user device portfolio 105. The Promotion Synchronization System 500 then identifies promotional material to be synchronized to the computing devices 100 of the user device portfolio 105. The computing device 100 that made the original request then receives any updated promotional material at that time. However, the remaining computing devices 100 of the user device portfolio 105 do not receive the updated promotional material at this time. Instead, a computing device 100 of the user device portfolio 105 that did not previously receive the updated promotional material will receive the updated promotional material the next time it initiates a synchronization request.

In an example of a "pull" synchronization in accordance with an embodiment of the present invention, a user with a user device portfolio 105, comprising a video game console and a smartphone, initiates a synchronization request on his or her smartphone. The synchronization request is processed by the Promotional Material Synchronization System 500 and returns the promotional material to the smartphone. The Promotion Indexing Service 300 of the Promotion Synchronization System 500 also stores a reminder to synchronize the same promotional material to the user's video game console the next time the video game console accesses the Promotional Material Synchronization System 500. When the video game console is later turned on by the user, the video game console initiates a synchronization request through a Synchronization Module 101. The Promotional Material Synchronization System 500 processes the synchronization request and delivers to the video game console the promotional material previously delivered to the user's smartphone.

According to an embodiment of the present invention, the Synchronization Gateway 200 is configured to "push" promotional material to the computing devices 100 of the user device portfolio 105. Data "push" synchronization sends the promotional material to part or all of the computing devices 100 of the user device portfolio 105 automatically when one of the computing devices 100 sends a synchronization request. The promotional material data "push" synchronization is tightly coupled to the capabilities of the computing devices 100 of the user device portfolio 105. Data related to how to find or reach the computing devices 100 of the user device portfolio 105 is stored in the User Profile Information Module 303 as described below.

In an example of a "push" synchronization in accordance with an embodiment of the present invention, a user with a user device portfolio 105, consisting of a video game console and a smartphone, initiates a synchronization request on his or her smartphone. The Promotional Material Synchronization System 500 processes the synchronization request and delivers the promotional material to the smartphone. Furthermore, The Promotion Indexing Service 300 of the Promotion Synchronization System 500 retrieves data stored in the User Profile Information Module 303 related to methods of delivering promotional material to the other computing devices 100 associated with the user device portfolio 105. The Promotion Indexing Service 300 determines that the promotional material is to be delivered to the video game console associated with the user device portfolio 105 and that the video game console can be reached through a specific Internet Protocol (IP) address and port number on which a Synchronization Module 101 is listening. The Promotion Indexing Service 300 transmits the promotional material and the IP address and port number to the Synchronization Gateway 200. The Synchronization Gateway 200 then delivers the promotional material to the user's video game console by connecting to the Synchronization Module 101 on the user's video game console via the IP address and port number.

One of ordinary skill in the art will appreciate that there are many ways to perform "push" synchronizations. Another example of "push" synchronization that is in accordance with an embodiment of the present invention utilizes a "polling" method, whereby the Synchronization Modules 101 located on the computing devices 100 of a user device portfolio 105 run a background process that automatically starts up at a given time interval and issues a synchronization request to check for updated promotional material.

According to an embodiment of the present invention, the Synchronization Gateway 200 is configured to deliver promotional material to the computing devices 100 of the user device portfolio 105 over an "out-of-band" synchronization. "Out-of-band" synchronization includes, but is not limited to, a synchronization based on an e-mail and/or SMS message. An example of an "out-of-band" synchronization is the delivery of promotional material by a method that would not utilize the Synchronization Gateway 200. Instead, in the "out-of-band" synchronization, the Promotion Indexing Service 300 initiates and sends an e-mail with the promotional material attached. Another example of an "out-of-band" synchronization is a link to promotional material that was sent to the computing devices 100 of a user device portfolio 105 as a "tweet" message via twitter.com.

According to an embodiment of the present invention, the Promotion Indexing Service 300 is configured to receive and store promotional material from a variety of different sources (e.g., Google™, Microsoft®, Yahoo!®). Alternatively, the Promotion Indexing Service 300 is configured to retrieve and store promotional material from the variety of different sources. Further, an embodiment of the present invention allows for the Promotion Indexing service to be configured to both receive and retrieve promotional material from the variety of different sources, depending on the configuration of the individual sources.

According to an embodiment of the present invention, the Promotion Indexing Service 300 comprises a User Profile Information Module 303 configured to store user profile information in an encrypted internal data store associated with each user's personalized identity. Any changes to the user profile information are updated in the User Profile Information Module 303. The profile information is retrieved when a synchronization request is received from a computing device 100 via the Synchronization Gateway 200 and is transported, over any suitable network, to the Promotion Indexing Service 300 to aid in the selection of promotional material to be synchronized to the user device portfolio 105, as described in detail below.

According to an embodiment of the present invention, the Promotion Indexing Service 300 is configured to store and index the promotional material in a Promotional Material Database 302. The Promotional Material Database 302 indexes promotional material by characterizations received from the source that provided the promotional material. The characterizations may include, but are not limited to, promotion medium, age range, gender and category (e.g., shopping, sports, entertainment, business).

According to an embodiment of the present invention, the Promotion Indexing Service 300 also comprises the Promotion Selection Algorithm Module 301. The Promotion Selection Algorithm Module 301 is a computer module configured to receive a user's profile information from the Synchronization Gateway 200 via the Promotion Connector Module 203. Once the user's profile information has been received, the Promotion Selection Algorithm Module 301 is configured to identify promotional material the user may find desirable and deliver the promotional material to the Synchronization Gateway 200 which is configured to deliver the promotional material to the user device portfolio 105.

The Promotion Selection Algorithm Module 301 uses the profile information to identify promotions to send to the user's computing devices 100. Algorithm decision logic is based on many factors, including, but not limited to, weighted user advertisement preferences, weights of advertisements, LBS availability, and advertisements already cached on the user's computing devices 100.

Weighted user advertisement preferences indicate whether the user prefers certain promotional material over others (e.g., a user indicates he or she prefers sports related promotional material to hobby related promotional material, and a sports related promotional material is available, a sports promotional material is more likely to be sent to the user).

Promotional material are cataloged and indexed into the Promotional Material Database 302 at the Promotional Indexing Service 300 and contain an established weight based on promotional material value. The higher the weight, the more likely the Promotion Selection Algorithm Module 301 will send it to a user.

The Promotion Selection Algorithm Module 301 takes into account the LBS availability for both the user's computing devices 100 and the availability of promotional material with available LBS data in the Promotional Material Database 302.

The Promotion Selection Algorithm Module 301 takes into account the user's interaction with promotional material currently or previously stored or cached on the user's computing devices 100. This information provides essential statistical data that is recorded and synchronized back to the Promotion Indexing Service 300 and is associated with the user's identity. For example, if a user views and saves more video promotional material than text promotional material, or views and saves more sport promotional material than hobby promotional material, these statistics tendencies may be used in part to determine what future promotional material will be selected by the Promotion Selection Algorithm Module 301.

For example, a user with a smartphone may input his or her promotional material preferences via the Promotion Management Module 102 of his or her computing device 100, and has selected baseball as his favorite topic, video gaming as a secondary favorite past time hobby, does not have GPS enabled on his phone, and has three existing promotional coupons related to sporting cached on his device. The Promotional Indexing Service 300 has already registered this user with an assigned Promotional User ID that records his interaction with the Promotion Management Module 102. When the user's profile information is sent from the Promotion Management Module 102 to Promotion Indexing Service 300 during the next synchronization, the Promotional Indexing Service 300 parses the information into input arguments for the Promotion Selection Algorithm 301. Since the user currently has three sporting promotional materials cached on the device and GPS is not enabled, the Promotional Selection Algorithm 301 may select a suitable video game promotion for the user based on a consideration of the profile information available. Therefore, the Promotion Indexing Service 300 parses information available in the User Profile Information Module 303 and from any additional information received from the Promotion Management Module 102 during the synchronization request, the Promotion Selection Algorithm 302 determines the best promotional material to send based on the weighted user advertisement preferences.

Figure 2:
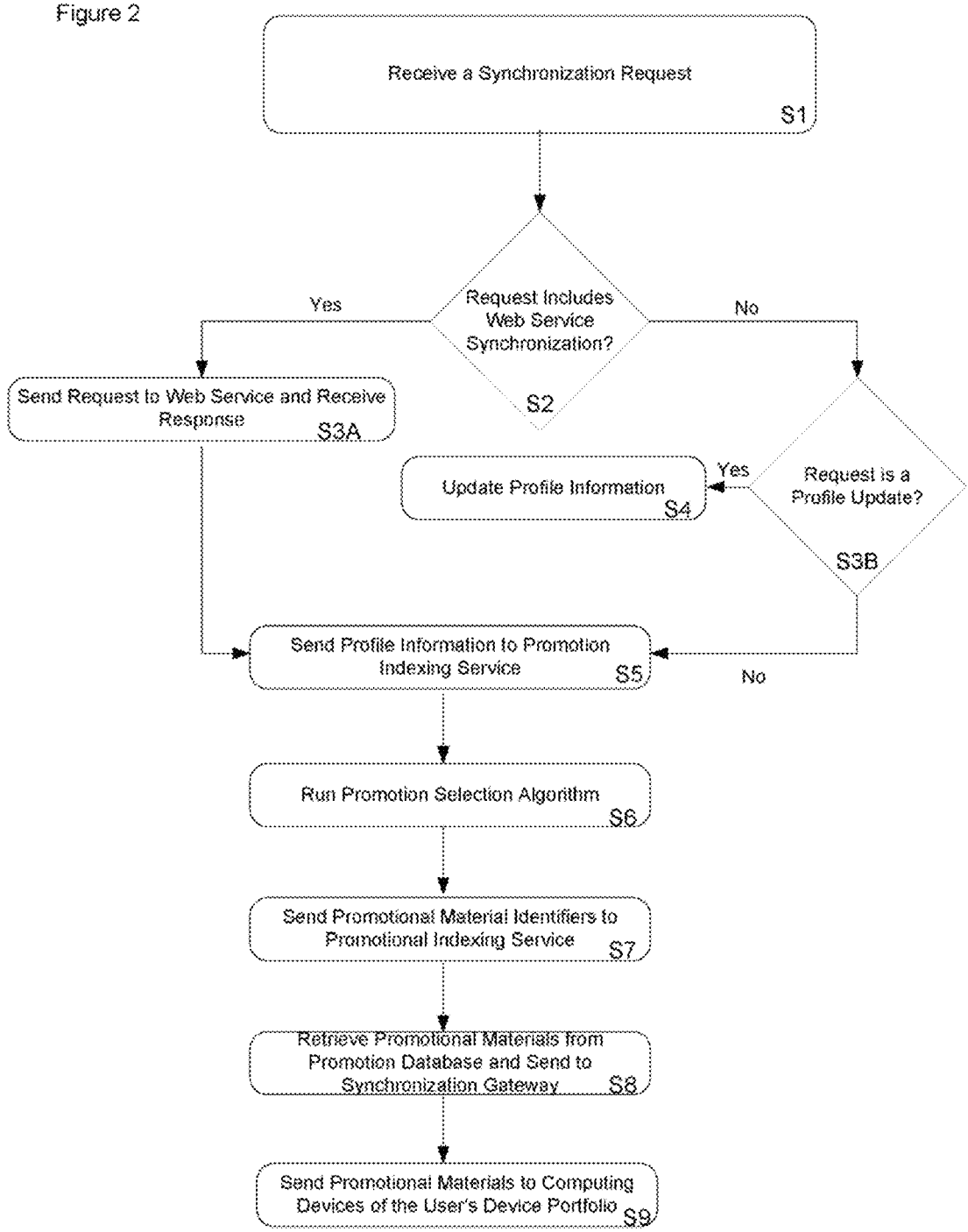
FIG. 2 illustrates an exemplary process for identifying, managing and delivering promotional material from a web service to a plurality of computing devices, according to an embodiment of the present invention.

FIG. 2 illustrates an exemplary process flow for identifying, managing and delivering promotional material to a plurality of computing devices 100 associated with a user device portfolio 105. It is to be understood that the schematic representation provided in FIG. 2 is exemplary in nature and alternative arrangements are within the scope of the invention. It should be further understood that the step numbers used in FIG. 2 are used to identify the steps and do not necessarily impart a particular order or sequence to the steps in the method.

According to an embodiment of the present invention, prior to the initiation of the process shown in FIG. 2, a user may engage in a 'setup' process configured to prepare his or her computing devices 100 for interaction with the system in accordance with the present invention. In the setup phase, the user downloads and installs the Synchronization Module 101 and the Promotion Management Module 102. Once these modules are installed, the user initializes the Promotion Management Module 102 with his or her identification and authentication information. According to an embodiment of the present invention, upon initialization, promotional material preferences (e.g., favorite sports, favorite games, hobbies, shopping habits) can be selected by the user to complete the "opt-in profile information." The term, "opt-in profile information," refers to a subset of profile information that the user allows to be used by the Promotional Material Synchronization System 500. The opt-in information is stored at the User Profile Information Module 303 and used by the Promotion Selection Algorithm 301 to identify desirable promotion materials.

Following the setup stage, in step S1, a user initiates a synchronization request. According to an embodiment of the present invention, the synchronization request may occur when the user requests the synchronization of his or her web service data between the user's computing device 100 and a web service 400, the user's computing device 100 and the Promotion Indexing Service 300 or the user computing device 100 and the User Profile Information Module 303.

Optionally, prior to sending the synchronization request, the Synchronization Module 101 may 1) interact with the LBS Module 103, if available, in order to obtain the customer's location coordinates, 2) interact with the Promotion Management Module 102 to check for updates to a user's profile information and 3) determine if there are any promotional material currently cached on the computing device 100.

According to an embodiment of the present invention, with the user profile information and all other supportive promotional material data in place, the Synchronization Module 101 of the user's computing device 100 issues a synchronization request which is transmitted over a suitable network via any suitable protocol.

According to an embodiment of the present invention, a synchronization request that involves a web service 400 causes two separate synchronization requests to be made by the user's computing device 100. The first synchronization request is related to synchronizing user web service data with the appropriate web service 400. The second synchronization request is associated with synchronizing promotional material. These two separate synchronization requests should be transparent to the user, and may appear as a single request.

In step S2, the Synchronization Gateway 200 determines if the synchronization request is destined for a web service 400. According to an embodiment of the present invention, the Synchronization Gateway 200 decrypts the request, identifies the user from the data provided in the request, and identifies the purpose of the request.

If the purpose of the synchronization request in step S2 is to synchronize the user computing devices 100 with a web service 400, the Synchronization Gateway 200 initializes the appropriate Web Service Connector Module 202. The Web Service Connector Module 202 then transmits the synchronization request to the appropriate web service 400.

In step S3A, the system determines the purpose of the synchronization request in step S2 is to synchronize the user's computing devices 100 with a web service 400. The Synchronization Gateway 200 initializes the appropriate Web Service Connector Module 202. The Web Service Connector Module 202 then transmits the synchronization request to the appropriate web service 400. The Web Service Connector Module 202 receives a response from the web service 400 and provides the response to the Synchronization Gateway 200.

In step S3B, the Synchronization Gateway 200 determines if the received synchronization request is designed to send updated profile information from the Promotion Management Module 102 on the user's computing device 100 to the User Profile Information Module 303 on the Promotion Indexing Service 300 or to synchronize promotional material between the user device portfolio 102 and the Promotional Indexing Service 300.

In step S4, the Synchronization Gateway 200 determines the synchronization request relates to sending new or updated profile information from the Promotion Management Module 102 of the users computing device 100 to the User Profile Information Module 303 of the Promotion Indexing Service 300. In this case, the profile information stored in the User Profile Information Module 302 is updated to reflect the requested changes. Once complete, the Synchronization Gateway 200 sends a confirmation to the user's computing device 100.

According to an embodiment of the invention, the Promotion Management Module 102 on a computing device 100 is configured to determine and send the computing device's 100 capabilities (i.e., ability to view different promotion mediums) to the User Profile Information Module 303 on the Promotion Indexing Service 300.

In step S5, the Promotion Connector Module 203 of the Synchronization Gateway 200 transmits all available profile information to the Promotion Indexing Service 300. The profile information includes any updated information received from the user's computing device 100, the information stored in the User Profile Information Module 303 and any information received from the web service 400.

In step S6, The Promotion Indexing Service 300 sends all profile information to the Promotion Selection Algorithm Module 301. The Promotion Selection Algorithm Module 301 receives the synchronization request for promotional material along with the user's profile information.

The Promotion Selection Algorithm Module 301 uses the profile information received to select promotional material that a user finds desirable. The selection of promotional material by the Promotion Selection Algorithm Module 301 includes selecting the appropriate format and medium of the promotional material based on the information received relating to the type and number of the user's computing devices 100 in the user device portfolio 105.

In step S7, the promotional material identifiers selected by the Promotion Selection Algorithm Module 301 are passed to the Promotion Indexing Service 300. The promotional material identifiers relate to entries in the Promotional Material Database 302.

One of ordinary skill in the art would appreciate that the promotional material identifiers be of any format, binary or otherwise, that could be used to locate data organized and stored on a computer system. An Exemplary embodiment would be a string or an integer that specifies an entry in a database.

In step S8, the promotional material identified by the Promotion Selection Algorithm Module 301 is retrieved from the Promotional Material Database 302 at the Promotion Indexing Service 300. The Promotion Indexing Service 300 then transports the promotional material to the Synchronization Gateway 200 via the Promotion Connector Module 203 over any suitable network.

In step S9, the Synchronization Gateway 200 delivers the promotional material and any synchronization data received from web services during step S3A to the computing devices 100 of a user device portfolio 105 over any suitable network via any suitable protocol. It should be noted that the Synchronization Gateway 200 may use multiple networks to complete the delivery of synchronization data to the various computing devices belonging to the user device portfolio 105.

According to an embodiment of the present invention, once the synchronization data has been received by a computing device 100, both the web services data and promotional material are stored on the device in a manner suitable for the particular computing device 100. This may include, for example, storing the promotional material in persistent storage (e.g., flash memory, hard disk drive, solid state drive).

According to an embodiment of the present invention, once the promotional material has been stored, the user is notified that new promotional material has been stored on the computing devices 100 of the user device portfolio 105.

One of ordinary skill in the art will appreciate that the steps of FIG. 2 may be executed in a multitude of different arrangements. For example, Step S3A may occur prior to, during, or after step S5. Furthermore, one of ordinary skill in the art will appreciate that the steps outlined in FIG. 2 may be implemented to run in parallel, in series, or a combination, when appropriate.

Figure 3:
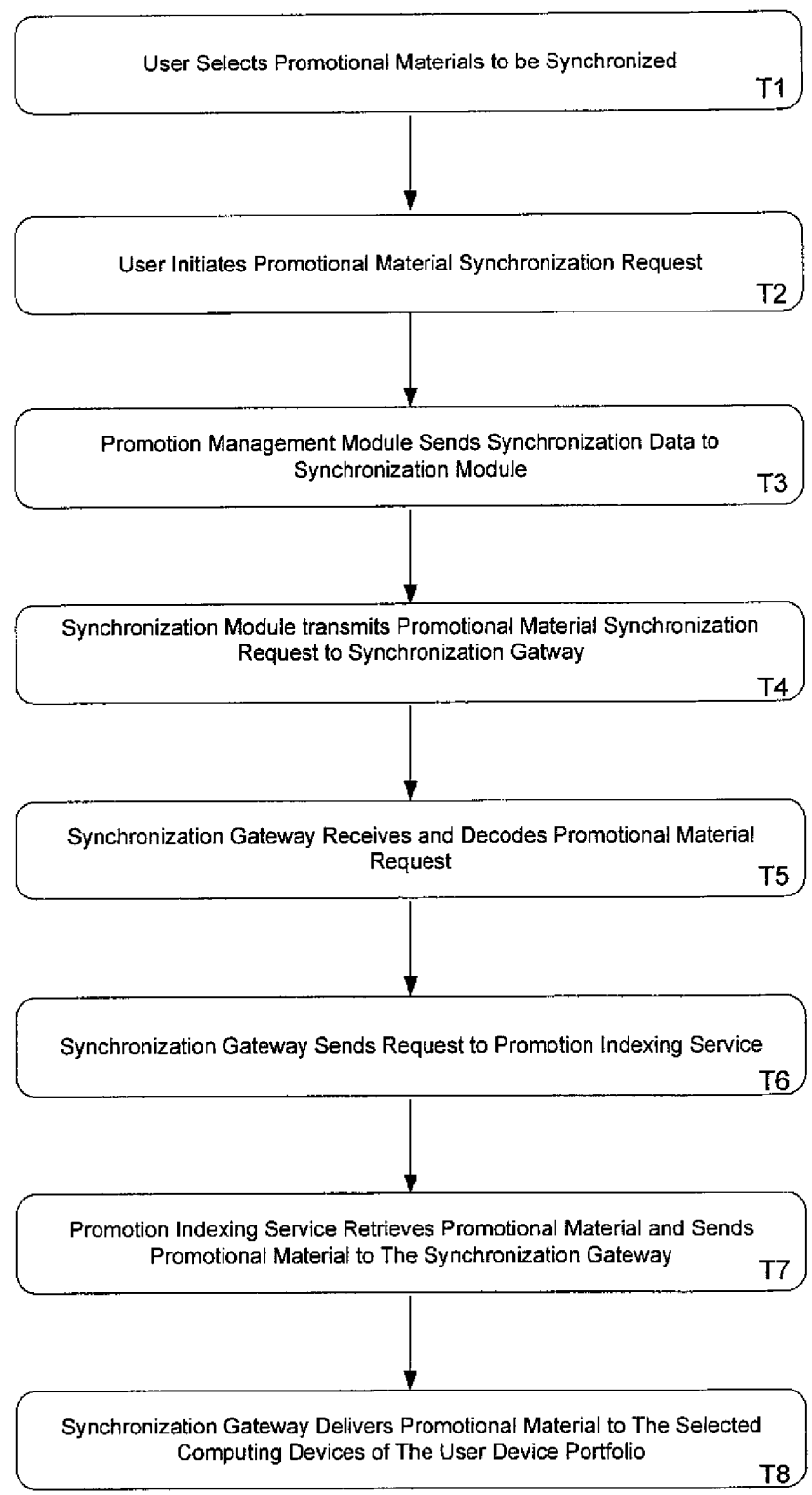
FIG. 3 illustrates an exemplary process for synchronizing delivery of promotional material present on one computing device in a user device portfolio to one or more additional computing devices associated with the user, according to an embodiment of the present invention.

FIG. 3 illustrates an exemplary process flow for synchronizing delivery of promotional material across part or all of the computing devices 100 of the user device portfolio 105 when one or more promotional material are present on one of the computing devices 100 in the user device portfolio 105 but not present on a second computing device 100 of the user's portfolio.

In step T1, a user, by way of the Promotion Management Module 102, selects promotional material, cached or stored, on his or her computing device 100 to be synchronized across part or all of the user device portfolio 105. According to an embodiment of the present invention, the user can select which computing devices 100 of the user device portfolio 105 synchronization of the promotional material should include.

In step T2, a user initiates a promotional material synchronization request. The promotional material synchronization request is a specialized type of synchronization request. Only promotional material residing on a user's computing device 100, and selected by the user, will be synchronized across the computing devices 100 of the user device portfolio 105 specified by the user.

In step T3, the Promotion Management Module 102 of the computing device 100 provides the necessary profile information to the synchronization gateway 200. According to an embodiment of the present invention, the necessary profile information consists of, but not limited to, user identification information, promotional material identifiers of the promotional material to be synchronized, and a list of the computing devices 100 of the user device portfolio 105 to which the selected promotional material are to be synchronized.

In step T4, the Synchronization Module 101 of the users computing device 100 sends the promotional material synchronization request over any suitable network via any suitable protocol, to the Synchronization Gateway 200.

In step T5, the Synchronization Gateway 200 receives and decodes the promotional material synchronization request. The decoding consists of decrypting the request, identifying the user from the data provided in the request, and identifying the purpose of the request.

In step T6, the Synchronization Gateway 200 has determined that the purpose of the request is a promotional material synchronization request and sends to the Promotional Indexing Service 300, via the Promotion Connector Module 203, a request for the promotional material identified by the promotional material identifiers in the promotional material synchronization request.

In step T7, the Promotional Indexing Service 300 uses the promotional material identifiers provided by the Synchronization Gateway 200 to retrieve from the Promotional Material Database 302 the promotional material identified in the promotional material synchronization request. Once the promotional material has been retrieved from the Promotional Material Database 302, The Promotional Indexing Service 300 sends the promotional material to the Synchronization Gateway 200 via the Promotion Connector Module 203.

In step T8, the Synchronization Gateway 200 delivers the promotional material to the computing devices 100 of the user device portfolio 105. The Synchronization Gateway 200 is configured to deliver the promotional material over a suitable network using any suitable protocol.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for synchronizing delivery of promotional material to a plurality of computing devices associated with a user, the method comprising:
    delivering, by a promotional material synchronization computer, promotional material for storage on a first computing device associated with a user, wherein the promotional material is delivered as a result of an interaction with a first web service;
    storing, by the promotional material synchronization computer, an association between the promotional material and profile information of the user;
    initiating, by a synchronization module executed by a second computing device, a synchronization request in response to at least one of: a launch of a second web service, a powering on of the second computing device, launching an application associated with the second web service, a request to update the profile information, or a launch of a program associated with the synchronization module;
    receiving, by the promotional material synchronization computer, the synchronization request comprising the profile information;
    identifying, by the promotional material synchronization computer, the promotional material previously stored on the first computing device based at least in part on the synchronization request and the profile information; and
    delivering, by the promotional material synchronization computer to the second computing device, the promotional material previously stored on the first computing device for storage on the second computing device.

2. The computer-implemented method of claim 1, wherein the synchronization request comprises a request for data to be synchronized with the second web service.

3. The computer-implemented method of claim 1, further comprising determining, by the promotional material synchronization computer, a format of the promotional material suitable for processing by the second computing device.

4. The computer-implemented method of claim 1, further comprising associating, by the promotional material synchronization computer, an additional computing device with the profile information.

5. The computer-implemented method of claim 4, further comprising determining, by the promotional material synchronization computer, a format of the promotional material suitable for processing by the additional computing device.

6. A system for synchronizing delivery of promotional material to a plurality of computing devices associated with a user, the system comprising:
    a promotional material synchronization computer configured to communicatively connect to a first promotion management module of a first computing device and a second promotion management module of a second computing device, the promotional material synchronization computer configured to:
        deliver promotional material to the first promotion management module for storage on the first computing device, wherein the promotional material is delivered as a result of an interaction with a first web service,
        store an association between the promotional material and profile information of the user,
        receive a synchronization request comprising the profile information from the second promotion management module of the second computing device,
        identify the promotional material previously delivered to the first computing device based at least in part on the profile information, and deliver, to the second promotion management module of the second computing device, the promotional material previously delivered to the first promotion management module of the first computing device for storage on the second computing device; and the synchronization module executed by the second computing device configured to initiate the synchronization request in response to at least one of: a launch of a second web service, a powering on of the second computing device, launching an application associated with the second web service, a request to update the profile information, or a launch of a program associated with the synchronization module.

7. The system of claim 6, wherein the synchronization request comprises a request for data to be synchronized with the second web service.

8. The system of claim 6, wherein the promotional material synchronization computer is configured to determine a format of the promotional material suitable for processing by the second promotion management module.

9. The system of claim 6, wherein the promotional material synchronization computer is configured to associate an additional computing device with the plurality of computing devices associated with the profile information.

10. The system of claim 9, wherein the promotional material synchronization computer is configured to determine a format of the promotional material suitable for processing by a promotion management module executable by of the additional computing device.

11. A non-transitory computer-readable memory including instructions that, when executed by a computer, cause the computer to perform operations comprising:

delivering, by the computer, promotional material for storage on a first computing device associated with a user, wherein the promotional material is delivered as a result of an interaction with a first web service;

storing an association between the promotional material and profile information of the user;

initiating, by a synchronization module executed by a second computing device, a synchronization request in response to at least one of: a launch of a second web service, a powering on of the second computing device, launching an application associated with the second web service, a request to update the profile information, or a launch of a program associated with the synchronization module;

receiving a synchronization request comprising the profile information from a second computing device associated with the user;

identifying the promotional material previously stored on the first computing device based at least in part on the profile information; and delivering, to the second computing device, the promotional material previously delivered to the first computing device for storage on the second computing device.

12. The non-transitory computer-readable memory of claim 11, wherein the synchronization request comprises a request for data to be synchronized with the second web service.

13. The non-transitory computer-readable memory of claim 11, further comprising determining a format of the promotional material suitable for processing by the second computing device.

14. The non-transitory computer-readable memory of claim 11, further comprising associating an additional computing device with the profile information.

15. The non-transitory computer-readable memory of claim 14, further comprising determining a format of the promotional material suitable for processing by the additional computing device.

* * * * *